Aug. 28, 1928.
G. W. GWINN
1,682,503
CIGAR BOX STAMPING MACHINE
Filed July 2, 1927
6 Sheets-Sheet 1
Fig. 1a.
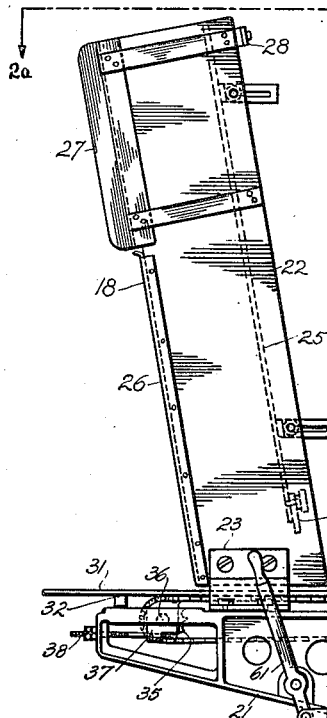
Fig. 2b.
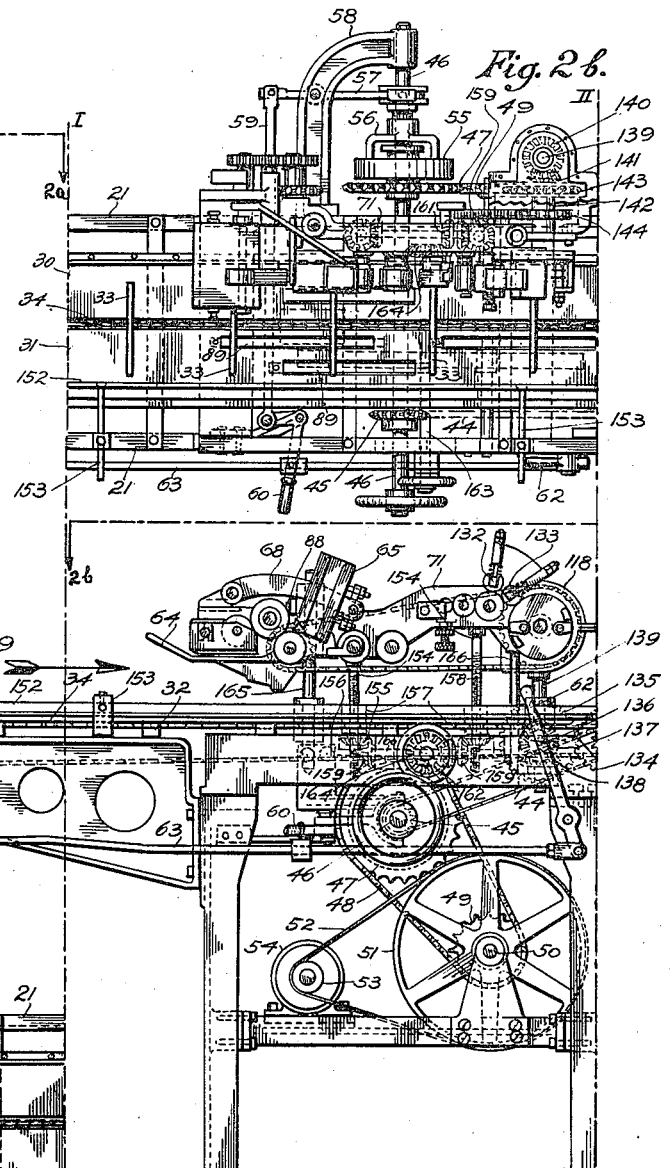
Fig. 2a.
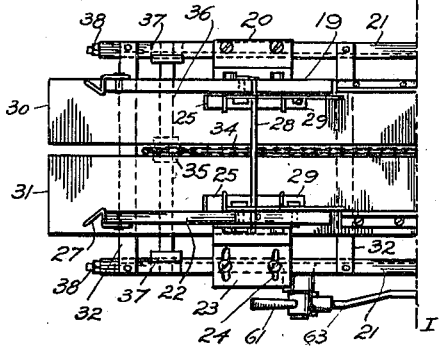
Fig. 1b.
INVENTOR
George W. Gwinn
BY
Sydney Prescott
ATTORNEY Aug. 28, 1928.
G. W. GWINN
1,682,503
CIGAR BOX STAMPING MACHINE
Filed July 2, 1927   6 Sheets-Sheet 2
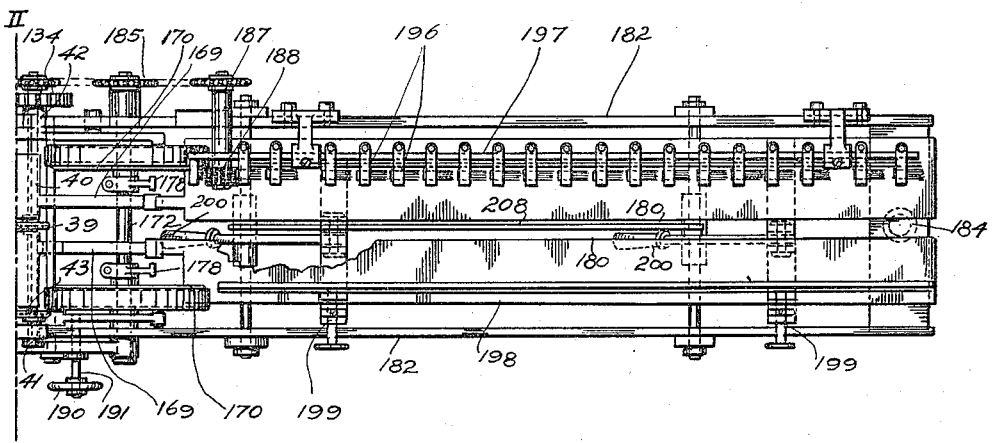
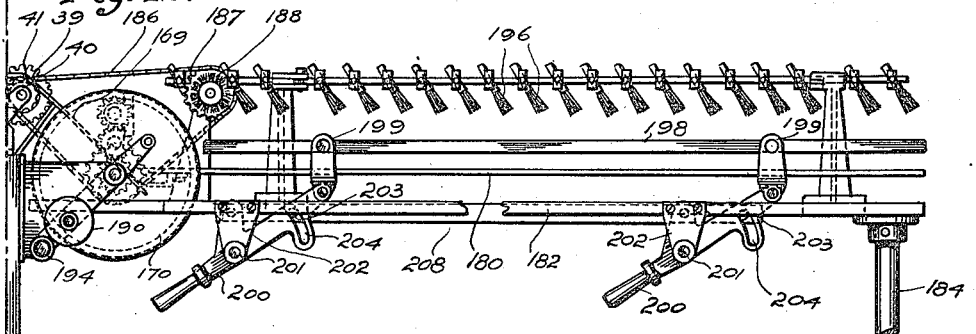
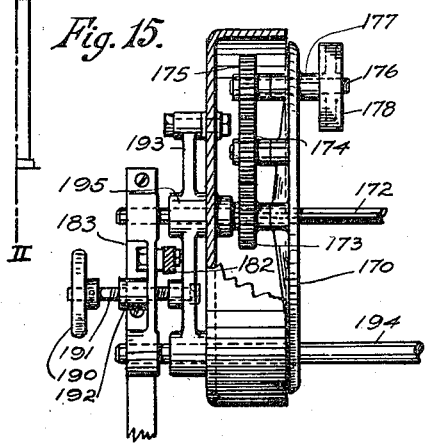
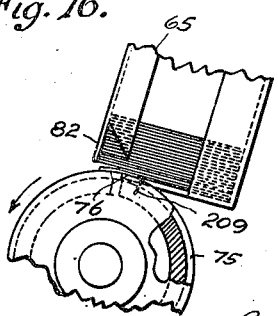
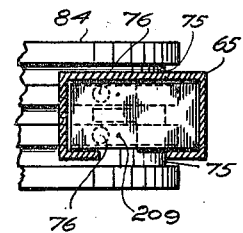
INVENTOR
George W. Gwinn
BY
Sydney Prescott
ATTORNEY Aug. 28, 1928.

G. W. GWINN 1,682,503

CIGAR BOX STAMPING MACHINE

Filed July 2, 1927

6 Sheets-Sheet 3

INVENTOR
George W. Gwinn
BY
Sydney Prescott
ATTORNEY

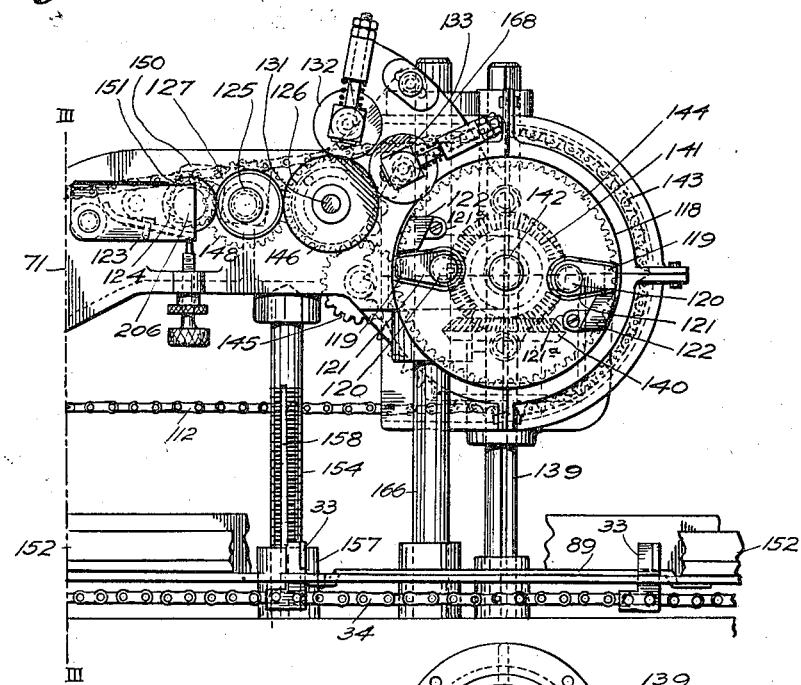

Aug. 28, 1928.　　　　　　　　　　　　　　　　　1,682,503
G. W. GWINN
CIGAR BOX STAMPING MACHINE
Filed July 2, 1927　　　6 Sheets-Sheet 5

INVENTOR
George W. Gwinn
BY
Sydney Prescott
ATTORNEY

Aug. 28, 1928.
G. W. GWINN
1,682,503
CIGAR BOX STAMPING MACHINE
Filed July 2, 1927    6 Sheets-Sheet 6
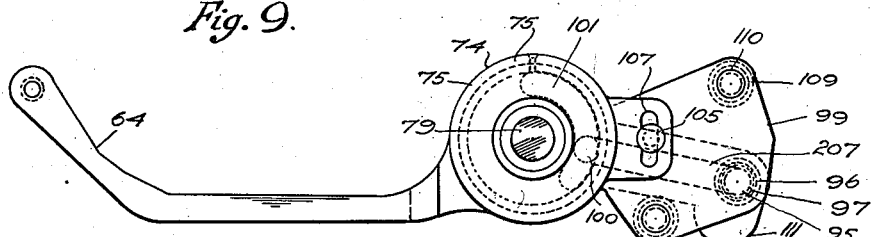
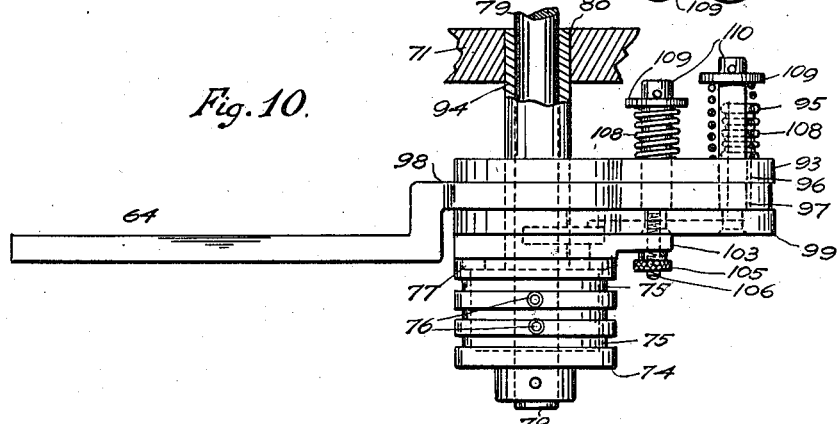
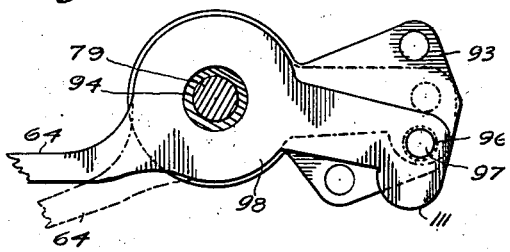
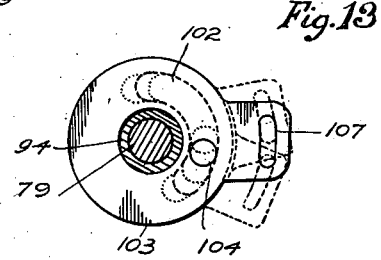
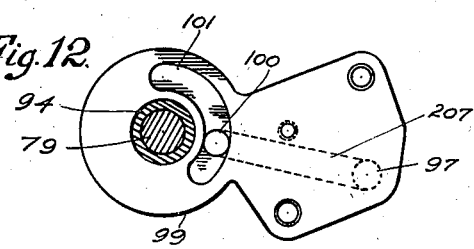
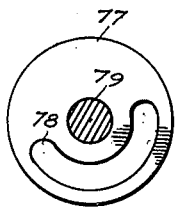
INVENTOR
George W. Gwinn
BY
Sydney Prescott
ATTORNEY Patented Aug. 28, 1928.

1,682,503

UNITED STATES PATENT OFFICE.

GEORGE W. GWINN, OF HEWLETT, NEW YORK, ASSIGNOR TO INTERNATIONAL CIGAR MACHINERY COMPANY, A CORPORATION OF NEW JERSEY.

CIGAR-BOX-STAMPING MACHINE.

Application filed July 2, 1927. Serial No. 203,073.

This invention relates to an improvement in a cigar box stamping machine. Its main object is the production of a machine operating to apply revenue stamps to the lids and front sides of a succession of cigar boxes. A further object is the production of a machine achieving this object, and also designed to operate on cigar boxes of different sizes. With these and other objects not specifically mentioned in view, the invention consists of certain constructions and combinations which will be hereinafter fully described and then specifically set forth in the claims hereunto appended.

Figure 3:
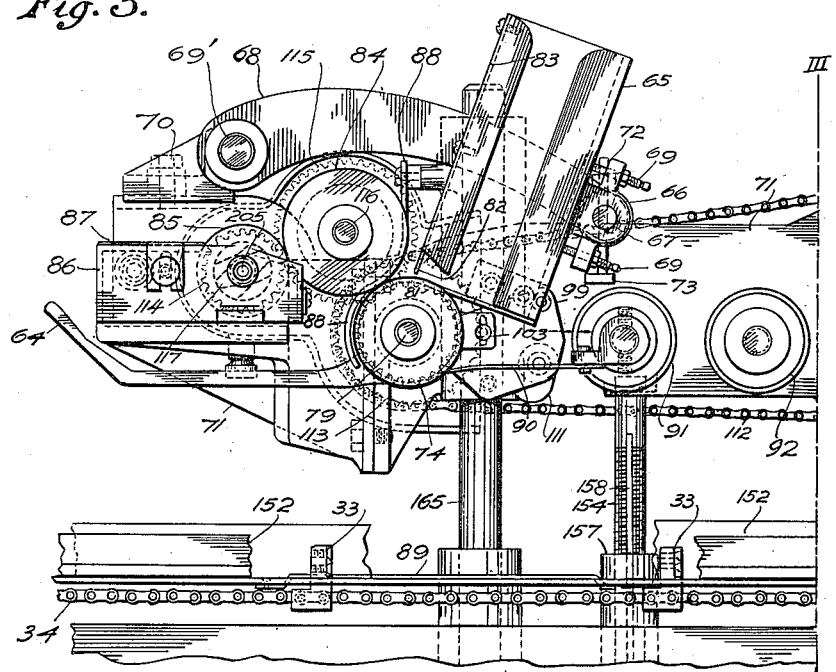
Figure 4:
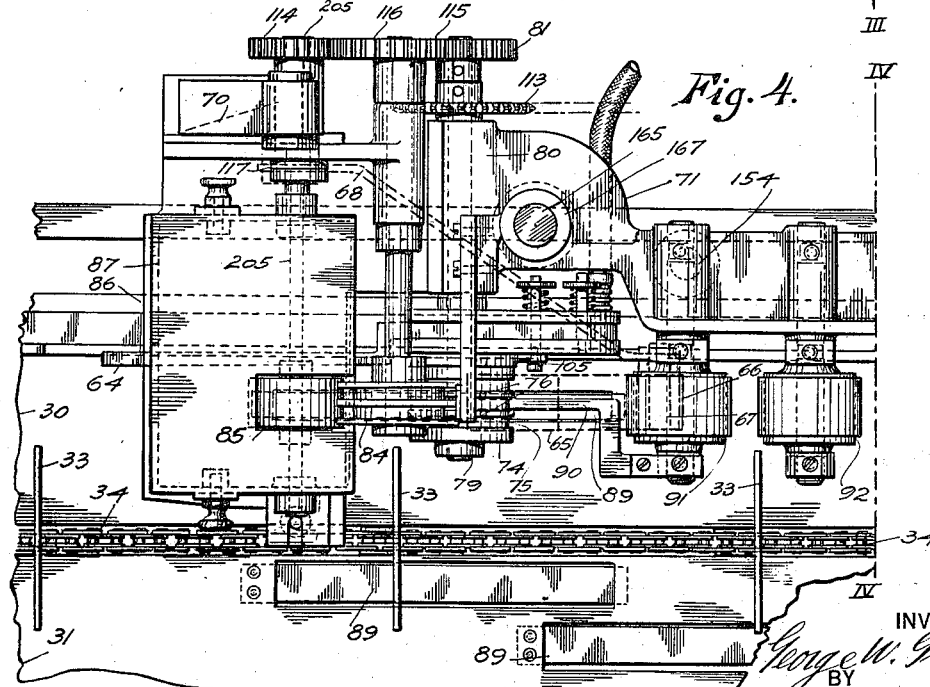
Figure 7:
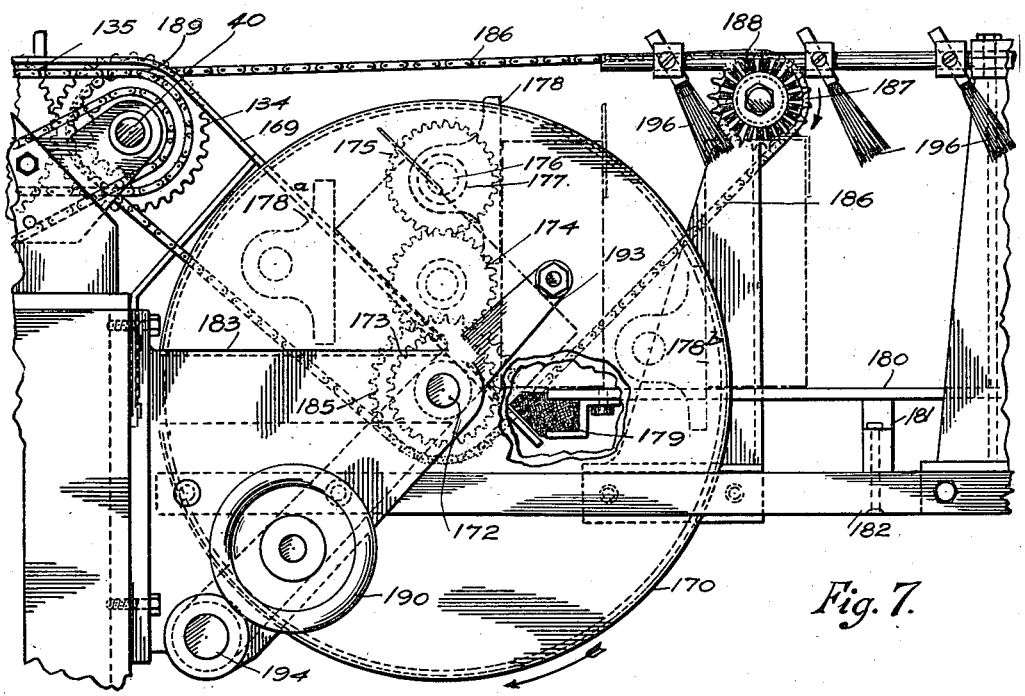
Figure 8:
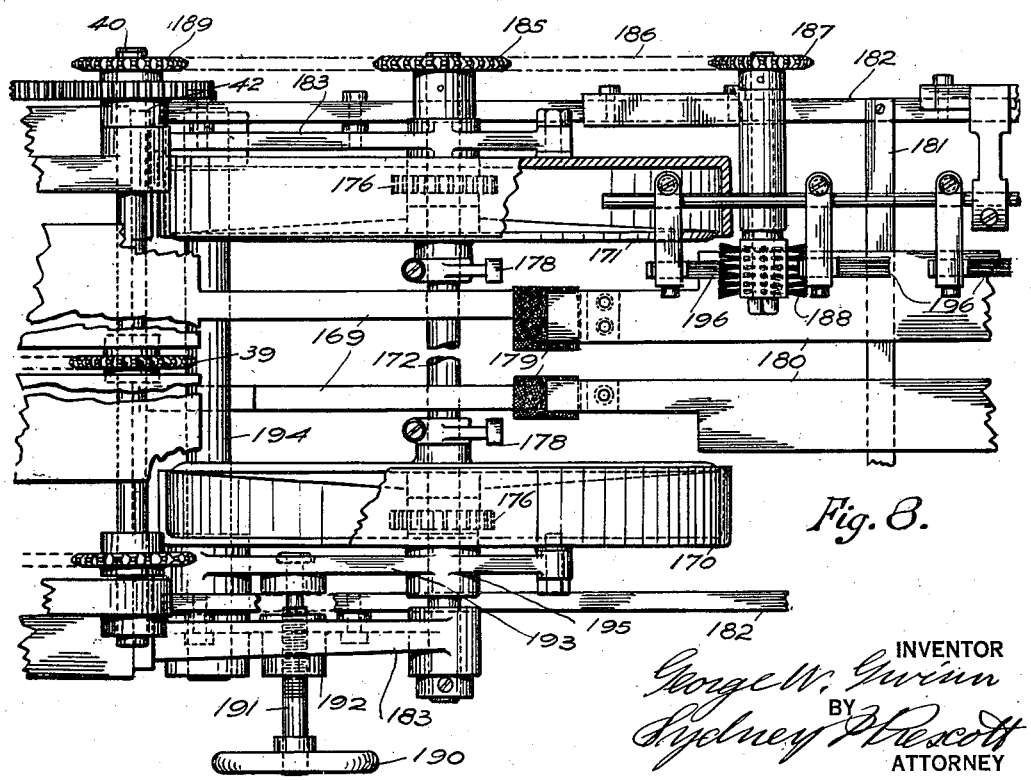

In the accompanying drawings, in which like characters of reference indicate the same or like parts, Figs. 1ª, 1ᵇ and 1ᶜ constitute a front elevation of a machine constructed in accordance with the invention, the Figures 1ª and 1ᵇ matching on the line I—I and the Figures 1ᵇ and 1ᶜ matching on the line II—II; Figs. 2ª, 2ᵇ and 2ᶜ represent a plan view of the machine illustrated in Figs. 1ª, 1ᵇ and 1ᶜ; Figs. 3 and 4 are respectively front elevation and plan of the stamp applying mechanism; Figs. 5 and 6 are respectively front elevation and plan of the stamp cancelling mechanism, Fig. 5 joining Fig. 3 on the line III—III and Fig. 6 joining Fig. 4 on the line IV—IV; Figs. 7 and 8 are respectively front elevation and plan of the box turning mechanism; Figs. 9 and 10 are respectively front elevation and plan of the suction controlling mechanism of the stamping mechanism; Figs. 11, 12, 13 and 14 are detail views of parts of the suction controlling mechanism; Fig. 15 is a sectional detail view of a part of the box turning mechanism; and Figs. 16 and 17 are detail views illustrative of the stamping feeding process.

In carrying the invention into effect, there is provided means for applying the leading ends of revenue stamps to corresponding surfaces of a succession of cigar boxes, means for cancelling the partially applied stamps, means for attaching the trailing ends of the stamps to adjacent surfaces of the boxes, and means for successively presenting the boxes to said other means. In the best constructions contemplated, there is further provided mechanism for moving the stamp applying means and stamp cancelling means to selectively cause them to act on boxes of different sizes; the applying means includes stamp feeding means and means for incapacitating said feeding means when a break occurs in the continuity of box presentation; said cancelling means includes a plurality of printing devices successively engaging the applied stamps; and said attaching means includes means for turning the boxes and means for pressing the trailing ends of the stamps on the turned boxes. All of the above mentioned means and mechanisms may be widely varied in construction within the scope of the claims, for the specific structure selected to illustrate the invention is but one of many possible concrete embodiments of the same. The invention, therefore, is not to be restricted to the precise details of the structure shown and described.

Referring to the drawings: The cigar boxes, loaded with cigars and ready for sealing by the proper revenue stamp, are introduced by hand into a magazine 18 having a stationary wall 19 fastened by an angle plate 20 to an outboard bracket 21. The magazine also has a movable side wall 22 fastened thereto by an angle plate 23 provided with screw slots 24 for adjustment purposes in accommodating boxes of different sizes. The side wall 22 has adjustable rear guides 25 and stationary front guides 26, and the introduction of the boxes is facilitated by resiliently flaring top guides 27. The rear guides 25 have bottom extensions 29 which are adjustable as to height in accordance with the height of the boxes. The lowermost box of a stack in the magazine rests on plates 30 and 31 fastened to a cross brace 32 secured to the outboard brackets 21.

The boxes to be stamped are successively removed from the stack in the magazine and forwarded in the direction of the arrow by the lugs 33 (Figs. 3 and 4) which slide over the plates 30 and 31 and are moved by an attached conveyor chain 34 running over a sprocket 35 (Figs. 1ª and 2ª) on a shaft 36 mounted in bearings 37 which are adjustable by means of take-up screws 38, and over a sprocket 39 (Figs. 1ᶜ and 2ᶜ) on a shaft 40 running in bearings 41 and 42. The shaft 40 carries a sprocket 43 which is driven by a chain 44 deriving its motion from a sprocket 45 on a shaft 46 (Figs. 1ᵇ and 2ᵇ). The shaft 46 has freely mounted on it a sprocket 47, driven by a chain 48 from a sprocket 49 on a shaft 50 carrying a pulley 51 driven by a belt 52 from the pulley 53 of a motor 54. The sprocket 47 is connected to a disc 55 of a friction clutch 56 which can be thrown in or out of action by means of a clutch lever 57 pivoted on a bracket 58 carrying the outboard bearing for the shaft 46. The clutch lever 57 is operatively connected through a rod 59 with a hand lever 60. Hand levers 61 and 62, connected by the rod 63 to the hand lever 60, enable the machine operator to stop or start the machine from different positions.

The boxes are pushed along the plates 30 and 31 in regular succession when the magazine is kept filled with a supply, the leading box engaging and lifting a cutoff arm 64 (Figs. 1b, 3, 4, 10 and 11), and passing underneath it, the following box reaching the cutoff arm 64 before the preceding box has entirely passed from under it, so long as a break in the continuity of box presentation does not occur. The arm 64 controls the stamp feeding suction device, and the suction valve is kept open except when a break in continuity occurs. The stamps are stacked in a magazine 65 having lugs 66 (Figs. 3 and 4) hinged on a pin 67 fast on the end of an arm 68, the set screws 69 enabling the operator to adjust the magazine to the angle best suited to the degree of stiffness of the stamps. The arm 68 is pivoted on a pin 69' of the support 70 secured to the lifting frame 71 and is held in position by the adjustable pin 72 resting on the lug 73.

The lowermost stamp in the magazine is removed by a suction drum 74 having grooves 75 and two suction holes 76 communicating with the interior of the drum which is closed at its inner end by the valve disc 77 provided with a timing slot 78 (Figs. 9 to 14). The drum 74 is fast on a shaft 79 supported in a bearing 80 of the lifting frame 71 and having mounted on it a gear 81. The stamps are successively snapped down from the magazine by the suction in the holes 76, the suction valve opening before the holes reach the leading ends of the stamps. The stamp immediately above the lowermost stamp is prevented from adhering to the lowermost stamp by being pushed against the lip 82 of the magazine wall 83 (Fig. 16). As an additional precaution to prevent a stamp from slipping on the drum 84, when the suction force is kept low to avoid pulling down two stamps instead of one, a couple of fine needle points 209 may be inserted in the surface of the drum as shown in Figs. 16 and 17.

As the suction drum turns, the stamp is made adhesive by a daubing roller 84 which has taken paste from a paste roller 85 of a paste pot 86 having a removable cover 87. A doctor 88 prevents any undue accumulation of paste on the stamp. The stamp carried by the drum is deposited on the cigar box passing underneath it and kept pressed up against it by leaf springs 89 in the plates 30 and 31. The stamp is stripped from the suction roller by a stripper 90 projecting into the centre groove of the suction roller 74. The cigar box, with the leading end of a stamp adhering to it but with the trailing end of the same protruding beyond the box, is then advanced underneath the rubber-covered rollers 91 and 92 which press down on the stamp and box and firmly attach the former to the latter.

The suction valve (Figs. 9 to 11) consists of a plate 93 fast to a sleeve 94 fastened to the lifting frame 71, and through which passes the shaft 79 of the suction roller. The plate 93 is provided with an air hose nipple 95 communicating through a hole 96 with an air hole 97 of a cutoff plate 98, when the lever 64, which is integral with it, is in its raised position. The air hole 97 communicates with a duct 207 on the inner side of a plate 99 which is fast on the sleeve 94. The duct 207 communicates through a hole 100 with a segmental duct 101 on the other side of the plate 99. The duct 101 coincides with a duct 102 on the timing disc 103. The duct 102 communicates through a hole 104 with the segmental slot 78 of the valve disc 11 in the suction drum. The timing disc 103 is adjustable by means of a nut 105 on a bolt 106 passing through a slot 107 and fixed in the plate 99. By changing the angular position of the timing disc, as indicated by the dotted lines in Fig. 13, the commencement of the suction can be retarded or advanced, its duration remaining the same. The plates 93, 98 and 99 are pressed together by a spring 108 bearing against the collars 109 of the pins 110 passing through the plates 93 and 98 and secured to the plate 99. Should there be a break in the continuity of box presentation, the lever 64 will drop and the cutoff plate will assume the position shown in dotted lines in Fig. 11. The lug 111 of the cutoff plate will then be interposed between the hole 96 and the duct 207, thus barring the passage of air and stopping the suction of the drum.

The paste roller, daubing roller, and suction drum (Figs. 3 and 4) are actuated by a chain 112 running over a sprocket 113 on the shaft 79 of the suction roller that carries a gear 81 meshing with a gear 115 on the shaft 116 of the daubing roller, the gear 115 meshing with a gear 114 on the shaft 205 of the paste roller. To facilitate quick removal of the paste box, the shaft 205 is made in two parts connected by a coupling 117.

After a stamp has been applied to a box, the latter is advanced into the range of action of the cancelling mechanism (Figs. 5 and 6). This mechanism includes a cylinder 118 having two brackets 119 and rollers 120 around which pass the date forms 121 and the cancelling forms 121a. The dating and cancelling forms 121 and 121a are inked in the following manner: The ink is transferred from the ink fountain 123 by the fountain roller 124 to an eccentrically mounted transfer roller 125 from which it is taken by a distributing cylinder 126. The transfer roller 125 has an elastic surface 127 which by reason of its eccentricity is alternately pressed against the fountain roller 124 and against the distributing roller or cylinder 126. To the latter is imparted an oscillating movement in the direction of its axis by the cam 128 which is kept pressing against a pin 129 by an axial spring 130, the distributing cylinder 126 being splined on its shaft 131. The ink on the distributing cylinder is then distributed by the roller 132 and transferred to the form roller 133 which applies it to the date and cancelling forms as they pass. As the box passes beneath the dating and cancelling cylinder, the applied stamp is dated and cancelled.

The dating and cancelling mechanism is actuated as follows: The shaft 40 carries a gear 134 which meshes with a gear 135 on a shaft 136 having a bevel gear 137 meshing with a bevel gear 138 on a vertical shaft 139. On the shaft 139 is splined a bevel gear 140 meshing with a bevel gear 141 on the dating and cancelling cylinder shaft 142 which carries a sprocket 143 and a spur gear 144. The latter, through an intermediate gear 145, actuates a gear 146 on a shaft 131 of the distributing cylinder. The gear 146 meshes with a gear 148 on the shaft 149 of the transfer roller. On the shaft 149 is eccentrically mounted a pawl 150 engaging a ratchet 151 on a shaft 206 of the ink transfer roller, to which is thus imparted an intermittent rotary motion.

The machine being designed to handle boxes of different sizes, the bottom plate guide rail 152 can be adjusted to the length of the boxes by the brackets 153 (Fig. 2$^b$). The elevating frame 71, carrying the stamp applying and cancelling mechanisms, is adjustable up and down by means of the screws 154 in engagement with mitre gears 155 (Fig. 1$^b$) which are rotatably mounted in brackets 156. The screws pass slidingly through the boxes 157 and are prevented from rotating therein by splines 158. The mitre gears 155 mesh with mitre gears 159 on a shaft 160 which also has a bevel gear 161 meshing with a bevel gear 162 on a shaft 163 turnable by means of a hand wheel 164. The elevating frame 71 is guided by posts 165 and 166 secured to the table frame and passing through vertical bearings 167 and 168 respectively.

As each box leaves the stamp cancelling mechanism, it is pushed down the bottom plate extensions 169 between discs 170 and 171 which function to turn the box in order that the trailing end of an applied stamp may be secured to another surface of the box. The discs 170 and 171 are mounted on a shaft 172 having gears 173 meshing with intermediate gears 174 which in turn mesh with gears 175 on the turning mechanism shaft 176 rotatably mounted in bearings 177 integral with the disc and on which are fixedly mounted arms 178. As the gears 173 and 175 are of the same diameter, the arms 178, in turning around the shaft 172, always remain in upright position, as shown at 178$^a$ and 178$^b$, Fig. 7, the angular motion of the gears 173 producing an equal but opposite angular motion of the gears 175. The box, coming to rest against bumpers 179, as shown by dotted lines in Fig. 7, is pushed or turned to an upright position by the arms 178, and is subsequently conveyed onto the bottom plates 180 of the stacker, resting on the transverse braces 181 secured to rails 182 which are fastened to the brackets 183, the farther end of the stacker resting on a support 184 (Figs. 1$^c$ and 2$^c$).

The discs are actuated by means of a sprocket 185 on the shaft 172 and a chain passing thereover and also over a sprocket 187 actuating the rotary brush 188 and over a driving sprocket 189 on the shaft 40.

The front disc 170 (Fig. 15) is adjustable laterally by means of a hand wheel 190 on a screw shaft 191 in threaded engagement with a boss 192 of the bracket 183 and turnably secured in an arm 193 sliding on a bar 194 and having a bearing 195 for the shaft 172.

The rotary brush 188 (Figs. 1$^c$ and 2$^c$) folds the trailing end of each stamp back over the corner of the box which is then pushed by the following box farther on the stacker table, the stationary brushes 196 confirming the trailing end of the stamp in its proper place.

The stacker bottom plates have a fixed guide rail 197 at one side and a movable guide rail 198, adjustable by means of brackets 199, at the other side. The bottom plates 180 are adjustable up and down by levers 200, connected by a rod 208, pivoted on shafts 201 in brackets 202 and secured by screws 203 in slots 204.

In view of the foregoing, a detailed description of the operation of the machine is deemed unnecessary and is therefore omitted in the interest of brevity.

What is claimed is:

1. The combination with means for applying the leading ends of revenue stamps to corresponding surfaces of a succession of cigar boxes, of means for cancelling the applied stamps, means for attaching the trailing ends of the stamps to adjacent surfaces of the boxes, and means for successively presenting the boxes to said applying means, cancelling means, and attaching means.

2. The combination with means for applying the leading ends of revenue stamps to corresponding surfaces of a succession of cigar boxes, of means for cancelling the applied stamps, means for attaching the trailing ends of the stamps to adjacent surfaces of the boxes, means for successively presenting the boxes to said applying means, cancelling means, and attaching means, and mechanism for moving said applying means and said cancelling means to selectively cause them to act on boxes of different sizes.

3. The combination with means for applying the leading ends of revenue stamps to corresponding surfaces of a succession of cigar boxes, of means for cancelling the applied stamps, means for attaching the trailing ends of the stamps to adjacent surfaces of the boxes, and means for successively presenting the boxes to said applying means, cancelling means, and attaching means, said applying means including stamp feeding means and means for incapacitating said feeding means when a break occurs in the continuity of box presentation.

4. The combination with means for applying the leading ends of revenue stamps to corresponding surfaces of a succession of cigar boxes, of means for cancelling the applied stamps, means for attaching the trailing ends of the stamps to adjacent surfaces of the boxes, and means for successively presenting the boxes to said applying means, cancelling means, and attaching means, said cancelling means including a plurality of printing devices successively engaging the applied stamps.

5. The combination with means for applying the leading ends of revenue stamps to corresponding surfaces of a succession of cigar boxes, of means for cancelling the applied stamps, means for attaching the trailing ends of the stamps to adjacent surfaces of the boxes, and means for successively presenting the boxes to said applying means, cancelling means, and attaching means, said attaching means including means for turning the boxes and means for pressing the trailing ends of the stamps on the turned boxes.

6. The combination with means for applying the leading ends of revenue stamps to corresponding surfaces of a succession of cigar boxes, of means for cancelling the applied stamps, means for attaching the trailing ends of the stamps to adjacent surfaces of the boxes, and means for successively presenting the boxes to said applying means, cancelling means, and attaching means, said presenting means including means for supporting a plurality of boxes and means for successively removing boxes from said supporting means and advancing them in spaced relationship to avoid interference with the trailing ends of the stamps.

7. The combination with means for applying the leading ends of revenue stamps to corresponding surfaces of a succession of cigar boxes, of means for cancelling the applied stamps, means for attaching the trailing ends of the stamps to adjacent surfaces of the boxes, means for successively presenting boxes to said applying means, cancelling means, and attaching means, and mechanism for moving said applying means and said cancelling means to selectively cause them to act on boxes of different sizes, said moving means including a frame supporting said applying means and said cancelling means, guides for said frame, and means for sliding said frame on said guides.

8. The combination with stamp feeding means, of means for presenting cigar boxes thereto, means for incapacitating said feeding means when a break occurs in the continuity of box presentation, and means for moving said feeding means to selectively cause it to act on boxes of different sizes.

9. The combination with a plurality of printing devices, of means for presenting stamped cigar boxes thereto to cause said devices to successively cancel the stamps, and means for moving said devices to selectively cause them to act on boxes of different sizes.

10. The combination with two rotating discs, of an inclined chute between said discs and down which slide cigar boxes to which the leading ends of revenue stamps are applied, means associated with said discs and chute for turning the boxes at the lower end of said chute and means for pressing the trailing ends of the stamps on the turned boxes to attach them thereto.

11. The combination with two rotating discs, of an inclined chute between said discs and down which slide cigar boxes to which the leading ends of revenue stamps are applied, parallel motion devices associated with said discs and chute for turning the boxes at the lower end of said chute, and means for pressing the trailing ends of the stamps on the turned boxes to attach them thereto.

12. The combination with stamp applying means, of stamp cancelling means, a frame supporting said applying means and said cancelling means, guides for said frame, means for sliding said frame on said guides, and means for presenting cigar boxes of different sizes to said applying means and said cancelling means.

13. The combination with stamp applying means, of stamp cancelling means, a frame supporting said applying means and said cancelling means, guides for said frame, screws for sliding said frame on said guides, gearing actuating said screws, and means for presenting cigar boxes of different sizes to said applying means and said cancelling means.

14. The combination with means for applying the leading ends of revenue stamps to corresponding surfaces of a succession of cigar boxes, of means for cancelling the applied stamps, means for attaching the trailing ends of the stamps to adjacent surfaces of the boxes, and means for successively presenting the boxes to said applying means, cancelling means, and attaching means, said applying means including suction stamp feeding means and means controlling the suction to incapacitate said feeding means when a break occurs in the continuity of box presentation.

15. The combination with means for applying the leading ends of revenue stamps to corresponding surfaces of a succession of cigar boxes, of means for cancelling the applied stamps, means for attaching the trailing ends of the stamps to adjacent surfaces of the boxes, and means for successively presenting the boxes to said applying means, cancelling means, and attaching means, said applying means including a suction stamp feeding cylinder and a yielding arm in the path of presented boxes for controlling the suction to incapacitate said cylinder when a break occurs in the continuity of box presentation.

16. The combination with means for applying the leading ends of revenue stamps to corresponding surfaces of a succession of cigar boxes, of means for cancelling the applied stamps, means for attaching the trailing ends of the stamps to adjacent surfaces of the boxes, and means for successively presenting the boxes to said applying means, cancelling means, and attaching means, said cancelling means including a rotating cylinder and a plurality of printing devices carried by said cylinder and successively engaging the applied stamps.

17. The combination with means for applying the leading ends of revenue stamps to corresponding surfaces of a succession of cigar boxes, of means for cancelling the applied stamps, means for attaching the trailing ends of the stamps to adjacent surfaces of the boxes, and means for successively presenting the boxes to said applying means, cancelling means, and attaching means, said attaching means including means for turning boxes to which the leading ends of stamps are applied and a rotary brush and stationary brushes for pressing the trailing ends of the stamps on the turned boxes.

18. Means for applying revenue stamps to corresponding surfaces of a succession of cigar boxes, comprising means for advancing the boxes, means for rolling the leading ends only of stamps on the boxes in transit, and means for producing a relative movement of said rolling means and said advancing means to selectively cause them to act on boxes of different sizes.

19. Means for causing stamp applying means and stamp cancelling means to selectively act on cigar boxes of different sizes, comprising means for advancing boxes through the range of action of said applying means and said cancelling means, and screw-actuated means for moving said applying means and said cancelling means toward and away from said advancing means.

In testimony whereof, I have signed my name to this specification.

GEORGE W. GWINN.